United States Patent
Borianne

(10) Patent No.: US 7,424,638 B2
(45) Date of Patent: Sep. 9, 2008

(54) MULTIPATH PROCESSOR WITH DEDICATED BUSES

(75) Inventor: Paul-Louis Borianne, Trets (FR)

(73) Assignee: STMicroelectronics S.A., Montrouge (FR)

(*) Notice: Subject to any disclaimer, the term of this patent is extended or adjusted under 35 U.S.C. 154(b) by 645 days.

(21) Appl. No.: 11/019,936

(22) Filed: Dec. 21, 2004

(65) Prior Publication Data
US 2005/0172163 A1 Aug. 4, 2005

(30) Foreign Application Priority Data
Dec. 30, 2003 (FR) .................................. 03 15573

(51) Int. Cl.
*G06F 11/00* (2006.01)
(52) U.S. Cl. ............................................. 714/7; 714/10
(58) Field of Classification Search .................. 714/7, 714/5, 6, 10–13
See application file for complete search history.

(56) References Cited

U.S. PATENT DOCUMENTS

| | | | | |
|---|---|---|---|---|
| 5,604,740 A | * | 2/1997 | Pinault et al. ............... | 370/463 |
| 5,778,243 A | * | 7/1998 | Aipperspach et al. .......... | 712/11 |
| 5,812,553 A | * | 9/1998 | Pinault et al. ................ | 370/419 |
| 6,006,293 A | * | 12/1999 | Thomas ....................... | 710/45 |
| 6,223,208 B1 | | 4/2001 | Kiefer | |
| 6,272,616 B1 | * | 8/2001 | Fernando et al. .............. | 712/20 |
| 6,278,959 B1 | * | 8/2001 | Alferness .................... | 702/186 |
| 7,015,916 B2 | * | 3/2006 | Sasaki et al. ................ | 345/531 |
| 7,272,674 B1 | * | 9/2007 | Nandi et al. .................. | 710/38 |

FOREIGN PATENT DOCUMENTS
WO  WO 03/088036  10/2003

OTHER PUBLICATIONS
Preliminary Search Report, FR 03 15573, dated Jul. 7, 2004.

* cited by examiner

*Primary Examiner*—Dieu-Minh Le
(74) *Attorney, Agent, or Firm*—Gardere Wynne Sewell LLP

(57) ABSTRACT

A device includes a processor (1) having two states (111, 112) each storing a processing path, a central unit (11) processing the paths in those states, at least one transfer bus (13) between the processor and peripherals, at least one processing path backup and restore bus (14), distinct from the data bus, and a backup and restore memory (15). A processing path controller (16) controls the transfer of a processing path between the memory and a state while the processor processes the processing path of another state. This allows for a reduction in the time wasted by the controller on restore or backup transfers.

30 Claims, 1 Drawing Sheet

MULTIPATH PROCESSOR WITH DEDICATED BUSES

PRIORITY CLAIM

The present application claims priority from French Application for Patent No. 03 15573 filed Dec. 30, 2003, the disclosure of which is hereby incorporated by reference.

BACKGROUND OF THE INVENTION

1. Technical Field of the Invention

The present invention relates to computer processors, and in particular to switching between the processing paths of a multi-path processor.

2. Description of Related Art

Computer processors are expected to perform, at high speed, very straightforward operations such as logic or arithmetical processing operations or the shifting of data from one location to another. To improve a computer's processing speed, the most frequent developments consist in increasing the clock rates of its different component parts, and in particular the processor clock rate. The size of processors has been steadily reduced so as to be able to increase their clock speed. However, there is a limit as to how far processor size can be reduced whereas there is an ever-present demand for faster processors. Other types of developments to increase the processing speed of processors have therefore been implemented.

One known technique for improving the processing speed is to use a multi-path or multithread processor. In a processor of this kind, a task to be performed is divided into sequences of independently executable instructions, called processing paths. The processing paths thus form sub-tasks executed by one and the same central processing unit of the processor. The central processing unit switches selectively between these different paths to effect the processing. In this way, when one processing path of the processor is stopped, the central processing unit switches to another processing path.

A processor known commercially as "PowerPC" is a multi-path processor. This processor includes a number N of multiple processing paths, to which the central processing unit switches sequentially. For each processing path, the central processing unit has an associated state. A state includes, for example, a general register, a floating point register, a control register, and a link register. The states are associated with a state backup memory and restore memory. When a state has just been used for a processing path and another path is to be used at a later stage, the processed path is saved in the memory. The path to be processed at a later stage is then read in the memory and restored in the state. Transfers between the processor and the backup/restore memory are carried out by a bus. This bus is also used for the transfer of data between the processor and other external peripherals, such as a random access memory.

Such a processor and its operating process have drawbacks. Indeed, processing unit clock cycles are used to carry out state backup and load tasks, and not to process a path. Toggling between processing different paths therefore takes up processing time. The processor is furthermore complex and expensive since it uses a great number of states.

There is therefore a need for a processor or a process of implementation that resolves one or more of these drawbacks.

SUMMARY OF THE INVENTION

In accordance with an embodiment of the invention, a device includes a multi-path processor and has two states each storing a processing path. A central processing unit selectively processes the processing paths stored in said states. At least one bus transfers data or instructions between the processor and external peripherals. The device further includes at least one processing path backup and restore bus, distinct from the data bus. A backup and restore memory are included in which the processing paths are able to be read and entered by the processor using the backup and restore bus. A processing path controller communicates with the processor via the backup and restore bus and controls the transfer of a processing path between the memory and a state while the processor processes the processing path of another state.

According to one variant, the backup and restore memory and the processing path controller are integrated into the processor.

According to another variant, the backup and restore memory is a RAM memory.

According to another variant, the processor includes a memory management unit and additional states in equal number to the number of states associated with the central processing unit, the controller also controlling the transfer of a processing path's memory management data between an additional state and the memory while the memory management unit processes the memory management data of a processing path stored in another additional state.

According to yet another variant, the data transfer bus is a 64-bit bus.

According to yet another variant, the backup and restore bus is smaller in size than the size of the transfer bus.

The controller may be expected to be a state machine.

According to a variant, the time for processing a processing path of a state is greater than the accumulated time for transferring a processing path from the other state to the memory and for transferring a processing path from the memory to this other state.

An embodiment of the invention also relates to a process for controlling a processing device. First and second processing paths are stored in first and second respective states associated with a central processing unit. The central unit processes the first processing path stored in the first state. During this processing, the second processing path is stored in a backup memory. Then, a third processing path is restored from the memory to this second state. The transfers of processing paths between the states and the memory are implemented using a dedicated backup and restore bus.

According to one variant, the process additionally includes processing by the central unit of the third processing path stored in the second state. During this treatment, the first processing path is saved in the backup memory, and a fourth processing path is restored from the memory to this first state.

According to another variant, where necessary, a processing step is of a duration greater than or equal to the accumulated durations of a backup step and a restore step.

According to another variant, the process additionally includes sending, prior to a step of processing the path stored in a state, a processing path switching request from the central unit to a processing path controller, using the dedicated bus. Transfer steps are controlled between the other state and the memory by the controller. A next processing authorization signal is transmitted at the end of the restore step, from the processing path controller to the central unit.

In accordance with an embodiment of the invention, a processing device includes a central processing unit capable of operation a processing path in a selected one of either, as well as switching between, a first or a second state. A processing path bus is connected to the central processor, and a memory is coupled to the processing path bus to store processing paths for the central processing unit. A path controller is coupled to the processing path bus and is operable to manage transfer of a first processing path between the memory and one of the first/second states of the central processing unit while the central processing unit processes a second processing path in the other of the first/second states.

In accordance with another embodiment, a process includes storing first and second processing paths in first and second respective states associated with a multi-path central processing unit. A switching of processing is made by the central processing unit from the first processing path stored in the first state to the second processing path stored in the second state. During the subsequent second processing path processing, the first processing path is saved to a memory, and a third processing path is loaded from the memory to the first state.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
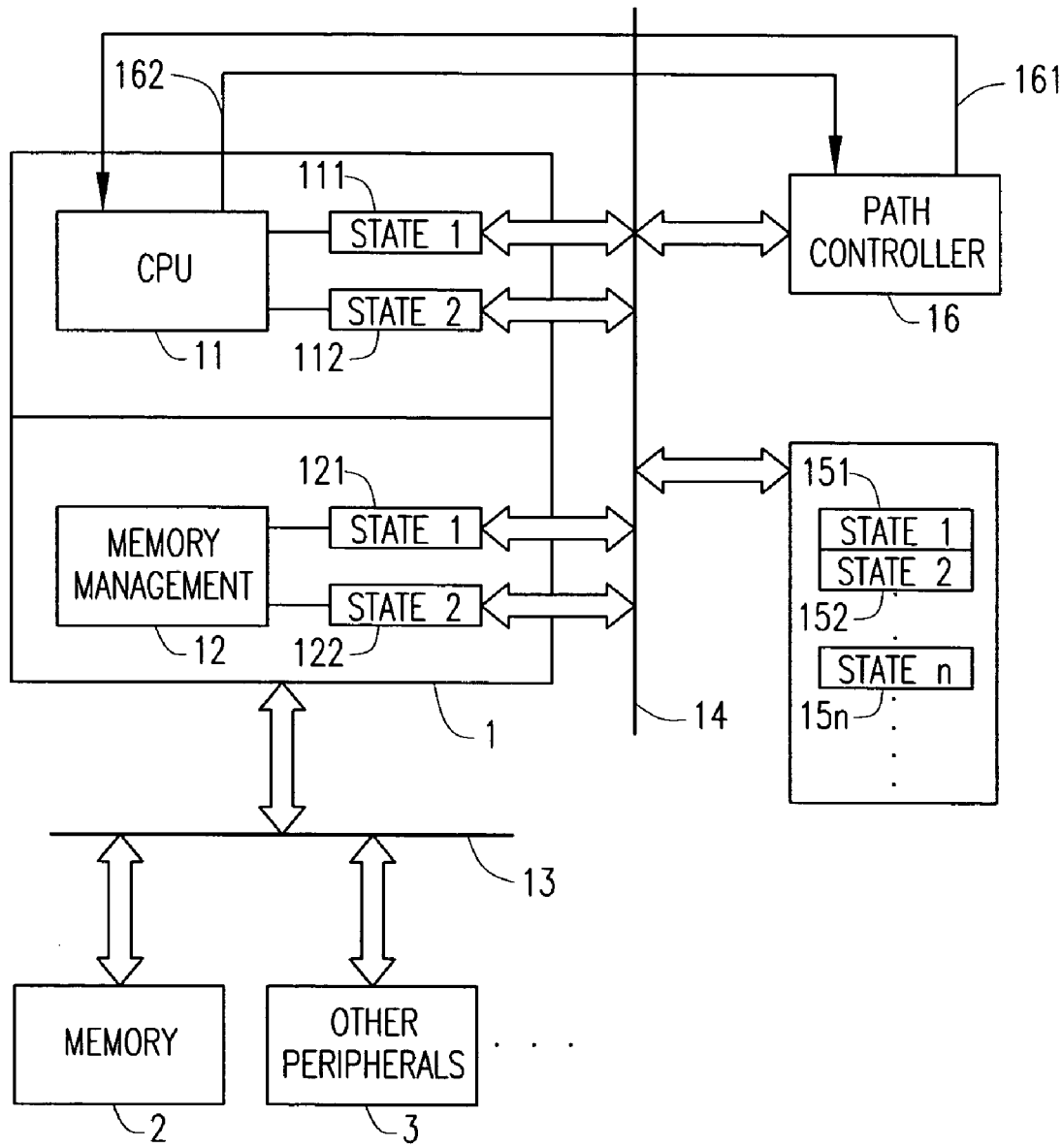
FIG. 1 shows a block diagram of a processing device implementing the invention.

Embodiments of the invention propose in a general way a processing device equipped with a multi-path processor. This processor has a central processing unit and two states each storing a processing path able to be processed selectively by the central processing unit. The processor has a data transfer bus for connection to peripherals and a distinct processing path backup and restore bus connected to a backup and restore memory. A processing path controller controls the transfer of a processing path between the memory and one of the processor states while the central unit processes the processing path of the other state.

In this way, the processing paths are backed up and restored in concealed time while a processing path is being processed by the central processing unit. The central processing unit thus loses fewer clock cycles for operations to backup and restore the processing paths. It may additionally be noted that embodiments of the invention allow the complexity and the cost of the processing device to be reduced.

FIG. 1 shows diagrammatically an example of a processing device according to the invention. This device has a processor 1. The processor 1 is equipped with a central processing unit 11 and two states 111 and 112. Each state may, for example, include registers which have been specified in the preceding summary of the prior art. The processing unit 11 has switching means allowing it to process selectively one of these states 111 or 112. The processor 1 has a bus 13 for transferring data or instructions between the processor 1 and external peripherals, such as a random access memory 2 or other peripherals 3. The processor 1 additionally has a processing path backup and restore bus 14, distinct from the transfer bus 13. In this way the processor 1 can communicate simultaneously through these two buses 13 and 14.

A backup and restore memory 15 is connected to the bus 14 so as to be read from or written to by the processor 1. The memory 15 is thus configured so that the processor 1 reads or enters a processing path in one of its states 151 to 15$n$. The memory 15 is, for example, a RAM memory.

A processing path controller 16 manages the transfers between the processor 1 and the memory 15, and more exactly the processing path transfers between the states 111, 112 and the states 151 to 15$n$. The controller 16 thus controls the transfer of a processing path between a respective state of the processing unit 11 and the memory 15, when the processing unit 11 processes a processing path of another state.

An operating example of the device will now be described. A processing path has previously been entered into the state 111 and is to be processed by the processing unit 11. This processing path will be termed the current processing path. The processing unit 11 has previously processed the previous processing path which is stored in the state 112. Before commencing the processing of the current processing path, the processing unit 11 emits a "switch processing path" signal to the controller 16. This signal can, for example, be emitted on a specific connection 162 using the bus 14. The central processing unit 11 then starts processing the current processing path. Simultaneously, the controller 16 controls the backup of the previous processing path in a state of the memory 15. This backup is implemented using the bus 14. The controller 16 then controls the transfer of the next processing path from the memory 15 to the state 112 using the bus 14. The controller 16 next emits a "processing path ready" signal on link 161 to the processing unit 11. The processing unit 11 is then able to switch to the state 112 so as to process the next processing path. The processing unit 11 is then able particularly to effect this switching, which may be required by its operating system. The processing device thus processes alternately the processing paths of the states 111 and 112 by repeating these steps.

The controller 16 thus controls the backup of the processing paths in the memory 15 and the restoring of the processing paths in the states 111 and 112, during the processing operations of the central unit 11. Switching the processing unit 11 between processing paths is thus extremely fast. Optimum performance is obtained by configuring the processing unit 11 in such a way that the processing of a processing path is longer than the backup and restoring operation carried out simultaneously by the controller 16. Waiting time between the end of a processing operation and the "processing path ready" signal is thus eliminated.

The processor 1 in FIG. 1 additionally has a memory management unit 12 that selectively processes states 121 and 122 storing memory management data for a processing path. The controller 16 also controls the transfer of memory management data between a state of the management unit and the memory 15 during the processing by the memory management unit 12 of the management data stored in the other state. Transfers carried out between the states 121, 122 and the memory 15 can be controlled by the controller 16 in a similar way to the transfers between the states 111, 112 and the memory 15.

To advantage, the central processing unit 11 only processes two states. The structure of the processor 1 can thus be simplified, while having the advantages of transfer in concealed time with the memory 15.

To advantage, the memory 15 or the controller 16 may be integrated into the processor 1.

The controller 16 is able particularly to be implemented in the form of a state machine or in the form of an 8, 16 or 32-bit microcontroller.

The size of the bus 14 is adapted to the desired speed of transfer between the processor 1 and the controller or the memory 15. An 8, 16 or 32-bit bus may particularly be expected.

The size of the bus 13 will generally be greater than the size of the bus 14. For a server processor, it will be particularly conceivable to have a bus 13 of a size at least equal to 64 bits.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A device, comprising:
    a processor for executing multiple processing paths consisting of sequences of independently executable instructions, and having two states each storing a processing path;
    a central processing unit selectively processing the processing paths stored in said states;
    at least one bus for transferring data or instructions between the processor and external peripherals;
    at least one processing path backup and restore bus, distinct from the data bus;
    a backup and restore memory in which the processing paths are read and entered by the processor using the backup and restore bus; and
    a processing path controller communicating with the processor via the backup and restore bus and controlling the transfer of a processing path between the memory and a state while the processor processes the processing path of another state.

2. The device according to claim 1, wherein the backup and restore memory and the processing path controller are integrated into the processor.

3. The device according to claim 1, wherein the backup and restore memory is a RAM memory.

4. The device according to claim 1, wherein the processor includes a memory management unit and additional states in equal number to the number of states associated with the central processing unit, the controller also controlling the transfer of a processing path's memory management data between an additional state and the memory while the memory management unit processes the memory management data of a processing path stored in another additional state.

5. The device according to claim 1, wherein the data transfer bus is a 64-bit bus.

6. The device according to claim 1, wherein the backup and restore bus is smaller in size than the size of the transfer bus.

7. The device according to claim 1, wherein the controller is a state machine.

8. The device according to claim 1, wherein the time for processing a processing path of a state is greater than the accumulated time for transferring a processing path from the other state to the memory and for transferring a processing path from the memory to this other state.

9. A process for controlling a processing device, including:
    a) storing first and second processing paths in first and second respective states associated with a central processing unit;
    b) processing by the central processing unit of the first processing path stored in the first state; and
    c) during this processing, saving the second processing path in a backup memory, then restoring a third processing path from the memory to this second state, the transfers of processing paths with the backup memory being implemented using a dedicated backup and restore bus, wherein each of the first, second and third processing path consists of a sequence of independently executable instructions.

10. The process according to claim 9, further including:
    d) processing by the central unit of the third processing path stored in the second state; and
    e) during this processing, saving the first processing path in the backup memory, then restoring a fourth processing path from the memory to this first state.

11. The process according to claim 10, wherein, where necessary, a processing step is of a duration greater than or equal to the accumulated durations of a backup step and a restore step.

12. The process according to any one of claim 10, further including:
    prior to a step of processing the path stored in a state, sending a processing path switching request from the central processing unit to a processing path controller, using the dedicated bus;
    controlling transfer steps between the other state and the memory by the controller;
    transmitting a next processing authorization signal at the end of the restore step, from the processing path controller to the central unit.

13. The process according to claim 9, wherein, where necessary, a processing step is of a duration greater than or equal to the accumulated durations of a backup step and a restore step.

14. The process according to claim 9, further including:
    prior to a step of processing the path stored in a state, sending a processing path switching request from the central processing unit to a processing path controller, using the dedicated bus;
    controlling transfer steps between the other state and the memory by the controller;
    transmitting a next processing authorization signal at the end of the restore step, from the processing path controller to the central unit.

15. A processing device, comprising:
    a central processing unit which operates a processing path in a selected one of either, as well as switching between, a first or a second state, wherein each processing path consists of a sequence of independently executable instructions;
    a processing path bus connected to the central processor;
    a memory coupled to the processing path bus and storing processing paths for the central processing unit; and
    a path controller coupled to the processing path bus and which manages transfer of a first processing path between the memory and one of the first/second states of the central processing unit while the central processing unit processes a second processing path in the other of the first/second states.

16. The processing device of claim 15 wherein the central processing unit, in connection with commencing processing a new processing path in one of the first/second states, communicates a switch processing path message to the path controller, and the path controller responds by transferring a next processing path from the memory to the other of the first/second states.

17. The processing device of claim 16 wherein the path controller, in connection with transferring the next processing path, communicates a processing path ready response back to the central processing unit.

18. The processing device of claim 15 further including a memory management module operable to process path processing path memory management data in a selected one of either, as well as switching between, a first or a second state which correspond to the first and second states of the central processing unit.

19. The processing device of claim 18 wherein the path controller coupled to the processing path bus is operable to manage transfer of first memory management data associated with the first processing path between the memory and one of its first/second states of the memory management module while the central processing unit processes the second processing path in the other of its first/second states and the memory management module stores second memory management data associated with the second processing path in the other of its first/second states.

20. The processing device of claim 15 wherein the path controller comprises a state machine operable separate from the central processing unit.

21. The processing device of claim 15 wherein the path controller comprises a microcontroller operable separate from the central processing unit.

22. The processing device of claim 15 wherein the path controller is an integral component of the central processing unit.

23. The processing device of claim 15 further including a peripheral component bus connected to the central processor and separate from the processing path bus.

24. A processing device, comprising:
   a multi-path central processing unit having a first processing path in a first state and a second processing path in a second state, wherein each of the first and second processing paths consists of a sequence of independently executable instructions;
   a memory coupled to the multi-path central processing unit for storing processing paths; and
   a path controller coupled to the multi-path central processing unit and which operates to manage transfer of processing paths between the memory and multi-path central processing unit such that a certain one of the processing paths is being updated on one of the first/second states while another one of the processing paths in the other of the first/second states is being processed by the multi-path central processing unit.

25. The processing device of claim 24 wherein the multi-path central processing unit, in connection with commencing processing of the another one of the processing paths in the one of the first/second states, communicates a switch processing path message to the path controller, and the path controller responds by transferring the certain one of the processing paths from the memory to the one of the first/second states and replying to the multi-path central processing unit with a processing path ready response.

26. The processing device of claim 24 wherein the path controller comprises a microcontroller operable separate from the central processing unit.

27. The processing device of claim 24 wherein the path controller is an integral component of the central processing unit.

28. The processing device of claim 24 further including a peripheral component bus connected to the central processor and separate from the processing path bus.

29. A process, comprising:
   storing first and second processing paths in first and second respective states associated with a multi-path central processing unit;
   switching of processing by the central processing unit from the first processing path stored in the first state to the second processing path stored in the second state; and
   during subsequent second processing path processing:
      saving the first processing path to a memory; and
      loading a third processing path from the memory to the first state,
   wherein each of the first, second and third processing path consists of a sequence of independently executable instructions.

30. The process of claim 29, further including:
   switching of processing by the central processing unit from the second processing path stored in the second state to the third processing path stored in the second state; and
   during subsequent third processing path processing:
      saving the second processing path to a memory; and
      loading a fourth processing path from the memory to the second state.

* * * * *